(12) United States Patent
Gao et al.

(10) Patent No.: US 10,748,276 B2
(45) Date of Patent: Aug. 18, 2020

(54) POSITIONING METHOD OF RECTANGULAR PIN ELEMENT BASED ON VERTEX POINTS

(71) Applicant: Harbin Institute of Technology, Harbin (CN)

(72) Inventors: Huijun Gao, Harbin (CN); Xianqiang Yang, Harbin (CN); Chao Xu, Harbin (CN); Lifei Bai, Harbin (CN)

(*) Notice: Subject to any disclaimer, the term of this patent is extended or adjusted under 35 U.S.C. 154(b) by 101 days.

(21) Appl. No.: 16/190,631

(22) Filed: Nov. 14, 2018

(65) Prior Publication Data

US 2019/0147580 A1    May 16, 2019

(30) Foreign Application Priority Data

Nov. 14, 2017 (CN) .......................... 2017 1 1124825

(51) Int. Cl.

| | |
|---|---|
| G06T 7/00 | (2017.01) |
| G06K 9/62 | (2006.01) |
| G06T 7/11 | (2017.01) |
| G06K 9/00 | (2006.01) |
| G06T 7/33 | (2017.01) |
| G06T 7/73 | (2017.01) |
| G06K 9/32 | (2006.01) |
| G06K 9/46 | (2006.01) |

(52) U.S. Cl.
CPC .......... *G06T 7/001* (2013.01); *G06K 9/00523* (2013.01); *G06K 9/3208* (2013.01); *G06K 9/4671* (2013.01); *G06K 9/6202* (2013.01); *G06K 9/6267* (2013.01); *G06T 7/11* (2017.01); *G06T 7/337* (2017.01); *G06T 7/74* (2017.01); *G06K 2209/19* (2013.01); *G06T 2207/30141* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 5,416,720 | A | * | 5/1995 | Fukui ................... G06F 30/392 |
| | | | | 716/123 |
| 6,212,751 | B1 | * | 4/2001 | Hattori ................ G05B 19/402 |
| | | | | 29/407.04 |

* cited by examiner

*Primary Examiner* — Dov Popovici
(74) *Attorney, Agent, or Firm* — Novoclaims Patent Services LLC; Mei Lin Wong

(57) ABSTRACT

A positioning method of rectangular pin element based on vertex points includes the steps of: obtaining component information and classifying components of a model into two classes; extracting feature descriptors of each vertex point of pin element of the model; obtaining a real image of the component and extracting feature points and an angle between two straight lines where the feature points are located and the positive direction of the X-axis respectively; obtaining a rotation angle and an precise feature point position; determining an precise feature point position corresponding to all the vertex points; obtaining feature descriptor of the vertex points of the actual component pin, a weight value of the vertex points of the component in the model, the vertex points of the actual component corresponding to feature point; and determining the final position of the center of the chip and a precise rotation angle of the chip.

9 Claims, 13 Drawing Sheets

POSITIONING METHOD OF RECTANGULAR PIN ELEMENT BASED ON VERTEX POINTS

CROSS REFERENCE OF RELATED APPLICATION

This application claimed priority of the application number 201711124825.4, filing date Nov. 14, 2017 filed in China. The contents of these specifications, including any intervening amendments thereto, are incorporated herein by reference.

BACKGROUND OF THE PRESENT INVENTION

Field of Invention

The present invention relates to general positioning method for multi-type rectangular pin patch components, which is in the field of Surface Mount Technology of component placement system with high speed and high precision visual inspection.

Description of Related Arts

The component package structure of the patch-type rectangular pin chip is rectangular, and the chip component has many I/O pins (small size), which is suitable for large-scale arrangement and plate making of printed circuit boards, and is widely used in processing and production of integrated circuits. The high level of integration of chip components on printed circuit boards places very stringent requirements on the placement of components.

The component placement machine is a production platform with high-speed and high-precision that places components without lead or with short lead surface assembly on the surface of printed circuit boards. It is a high-end equipment for opto-mechatronics. Surface mount technology based on machine vision inspection is one of the core technologies for the components placement to accurately mount components. It can realize the functions of detection, recognition, accurate positioning and defect detection of different types of chip components. Among them, the precise positioning of components is the core of this technology. The placement machine acquires specific parameter information such as component size and pin parameters through standard component detection, and establishes a component parameter database. In the online production stage, the placement machine will accurately position the components to be tested based on the standard parameters in the database.

Commonly used rectangular pin component positioning methods include positioning methods based on component pin contour matching and positioning methods based on component pin contour cascade filtering. The positioning method of component pin contour matching has the following disadvantages: 1) The algorithm needs to establish and save templates of different angles, and has higher memory requirements for the computer; 2) The algorithm positioning result is easily affected by the edge of the pin profile; and 3) Poor real-time performance. The positioning method of component pin contour cascade screening mainly has the following disadvantages: 1) The algorithm needs to design different detection schemes according to the distribution of the rectangular pins of the components, which reduces the versatility of the algorithm; 2) The positioning detection result has low precision. The positioning result of the algorithm is related to the screening result of the contour. The center and rotation angle of the component are determined by calculating the center of each pin, and the contour matching result cannot improve the accuracy of detecting the contour; 3) Using the contour-level screening method, the complexity of the algorithm is increased, and the execution time of the algorithm is increased.

SUMMARY OF THE PRESENT INVENTION

An object of the present invention is to solve the problems existing in the field of the existing on-line positioning algorithm of the patch-type rectangular lead component, such as weak robustness, low precision, poor versatility and low real-time performance, and provide a method of positioning rectangular pin elements based on vertex points (keys).

A positioning method of rectangular pin component based on vertex points, comprising the steps of:

Step 1: Obtaining component information of a model by using an image processing method or a component datasheet (datasheet), the component information comprises a component size, number of pins, pin length, pin width and pin location;

Step 2: classifying the component into two classes based on a pin distribution in which the first type is that the pins are distributed on the upper and lower sides or the left and right sides of the components, and the second type is that the pins are distributed on the upper, lower, left and right sides of the components; and defining the key vertex points of the pin element of the component of the model as the two vertex points on each rectangular pin away from the chip body, and recording as $V=[v_1, v_2, \ldots v_M]^T$, where, $v_i \in R^2$, $i=1, 2, \ldots$ refers to the position of the i-th key vertex point, and is a row vector of a two-dimensional vector; M refers to the number of key vertex points, $R^2$ refers to two-dimensional space;

Step 3; Extracting feature descriptors for each key vertex point of the pin element of the component of the model, wherein the feature descriptor is represented by a distance between key vertex points, and a feature vector of an i-th key vertex point of the component of the model is represented by the vector $F_{mi}$ of an M-dimensional vector;

Step 4: Obtaining a real image of an actual component online and processing the real image of the actual component by FAST method to extract feature points (corner points);

Step 5: based on locations of the feature points extracted from step (4), extracting a feature point angle between two straight lines (which is at the position of the vertex of the pin, the straight lines formed at two sides of the vertex of the pin element) and a positive direction of an X-axis for each feature point respectively, and obtaining a feature point angle set as A and an X-axis is along a horizontal direction;

Step 6; based on the feature point angle set A obtained from step (5), sorting and filtering the feature point angel set A with a mixed Gaussian mixture model and obtaining a rough rotation angle of the actual component;

Step 7: using each feature point from step (6) as an center, building a square search window with a side length of 6~10 pixel to process searching, and obtaining positions of sub-pixel level feature points, which are positions of the precise feature points, by sub-pixel corner position detection algorithm searching method of open cross-platform computer vision library (OpenCV);

Step 8: obtain the position and angle of the actual component by using the point set registration CPD (coherent point drift) algorithm, and obtaining the positions of precise feature points which are corresponding to the positions of all key vertex points respectively;

Step 9: using the positions of the precise feature points which are corresponding to the positions of all key vertex points obtained from Step (8), obtaining feature descriptor of the key vertex points of the pins of the actual component, using the vector $F_{ri}$ of an M-dimensional vector to represent the feature vector of an i-th key vertex point of the actual component;

Step 10: based on the feature vector of the key vertex points of the model component obtained from step (3) and the feature vector of the key vertex points of the actual component obtained from step (9), determining weight values of feature point pairs corresponding to vertex points of model component and vertex points of actual component;

Step 11: based on the position and angle of the actual component obtained from step (8) and the weight values of feature point pairs corresponding to vertex points of model component and vertex points of actual component obtained from step (10), determining the final position of the center c of the chip (actual component) and the precise rotation angle θ of the chip.

The present invention has the following advantageous technical effects:

The invention can increase the robustness of the processing algorithm, improve the positioning precision, and improve the processing speed. Using the SOP (Small Outline Package) with upper and lower pins and the QFP (Quad Flat Pack) chip with upper, lower, left and right pins as examples, Halcon software provides a recognition rate of 93.47%, an angle accuracy of 0.0219°, a position accuracy of 0.5 pixels, and a processing time of 74.2 ms. SM482 provides a recognition rate of 98.16%, an angle accuracy of 0.01827°, a position accuracy of 0.48 pixels, and a processing time of 65.3 ms. The method of the present invention provides a recognition rate of 99.37%, an angle accuracy of 0.01073°, a (position) pixel accuracy of 0.02 pixels, and a processing time of 15.3 ms.

The data results show that the robustness of the method of the present invention is better than that of the Samsung SM482 pick and placement machine with HALCON software. The recognition accuracy is higher than that of SM482 and Halcon, and the processing speed is faster than SM482 and HALCON.

DETAILED DESCRIPTION OF THE PREFERRED EMBODIMENT

Preferred Embodiment 1

Figure 1:
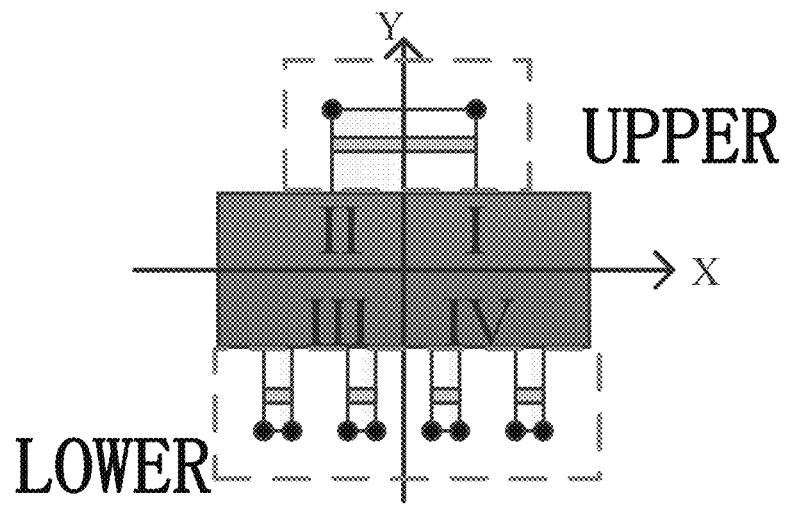
FIG. 1 is a schematic diagram of a TR component package.
Figure 2:
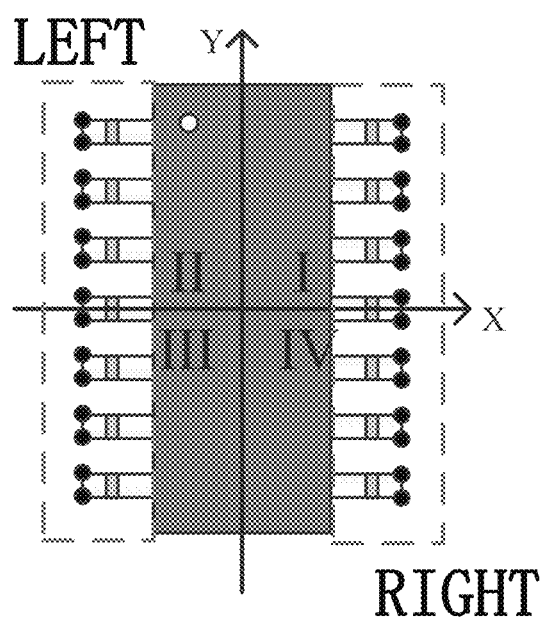
FIG. 2 is a schematic diagram of a SOP component package.
Figure 3:
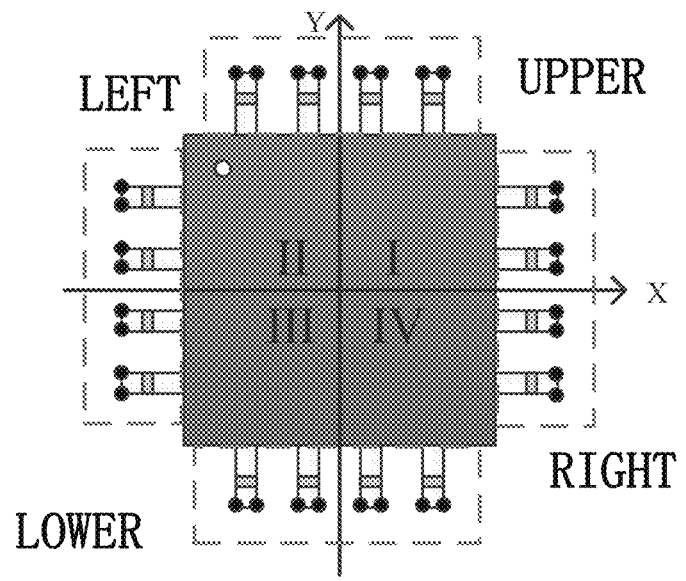
FIG. 3 is a schematic diagram of a TR component package.

A method of positioning rectangular pin elements based on vertex points, comprising the steps of:

Step 1: Obtaining component information of a model by using an image processing method or a component datasheet, the component information comprises a component size, pin count, pin length, pin width and pin location;

Step 2: classifying the component into two classes based on a pin distribution in which the first type is that the pins are distributed on the upper and lower sides or the left and right sides of the components, and the second type is that the pins are distributed on the upper, lower, left and right sides of the components;

Defining the key vertex points of the component pin of the model as the two vertex points on each rectangular pin away from the chip body (all solid black circles shown in FIG. 1 to FIG. 3), and recording as $V=[v_1, v_2, \ldots v_M]^T$, where, $v_i \in R^2$, i=1, 2, . . . refers to the position of the 1-th key vertex point, and is a row vector of a two-dimensional vector; M refers to the number of key vertex points, $R^2$ refers to two-dimensional space; as shown in FIG. 1 to FIG. 3 of the drawings, the key vertex points of the TR, SOP and QFP components in three different package types. The small solid circle represents the key vertex point, the coordinate system of the key vertex point is the coordinate system as shown in FIG. 1 to FIG. 3. The three different package types refers to pins distributed on the component at the upper and lower sides, the left and right sides, and the upper, lower, left and right sides.

Step 3: Extracting feature descriptors for each vertex point of the pin element of the component of the model, wherein the feature descriptor is represented by a distance between vertex points, and a feature vector of an i-th vertex point of the component of the model is represented by the vector $F_{mi}$ of an M-dimensional vector;

Step 4: Obtaining a real image of an actual component online and processing the real image of the actual component by FAST method to extract feature points (corner points);

Step 5: based on locations of the feature points extracted from step (4), extracting a feature point angle between two straight lines at which each feature point is located (that is, the line at the vertex of the pin that forms the two sides of the apex of the pin) and a positive direction of an X-axis for each feature point, obtaining a feature point angle set as A, establishing a coordinate system with a center of the actual component image as an origin and an X-axis is along a horizontal direction;

Step 6; based on the feature point angle set A obtained from step (5), sorting and filtering the feature point angel set A with a mixed Gaussian mixture model and obtaining a rough rotation angle of the actual component;

Step 7: using each feature point from step (6) as an center, building a square search window with a side length of 6~10 pixel to process searching, and obtaining positions of sub-pixel level feature points, which are positions of the precise feature points, by using sub-pixel corner position detection algorithm searching method of open cross-platform computer vision library (OpenCV);

Step 8: obtaining the position and angle of the actual component by using the point set registration CPD (coherent point drift) algorithm, and obtaining the positions of all key vertex points which are corresponding to the positions of the precise feature points respectively;

Step 9; using the positions of all key vertex points which are corresponding to the positions of the precise feature points obtained from Step (8), obtaining feature descriptor of the key vertex points of the pins of the actual component, the vector $F_{ri}$ of an M-dimensional vector represents the feature vector of an i-th vertex point of the actual component;

Step 10: based on the feature vector of the key vertex points of the model component obtained from step (3) and the feature vector of the key vertex points of the actual component obtained from step (9), determining weight values of feature point pairs corresponding to vertex points of model component and vertex points of actual component;

Step 11: based on the position and angle of the actual component obtained from step (8) and the weight values of feature point pairs corresponding to vertex points of model component and vertex points of actual component obtained from step (10), determining the final position of the center c of the chip and the precise rotation angle θ of the chip.

Preferred Embodiment 2

This embodiment differs from the Preferred Embodiment 1 in that: in the step 3, $F_{mi}$ is defined by:

$$F_{mi}=[\|v_1-v_i\|_2, \ldots \|v_M-v_i\|_2]$$

Wherein $\|\cdot\|$ is 2-norm of the vector.

The other steps and parameters are the same as that of the Preferred Embodiment 1.

Preferred Embodiment 3

This embodiment differs from the Preferred Embodiment 1 or 2 in that: in the step (4), the process of obtaining a real image of an actual component online and processing the real image of the actual component by FAST method to extract feature points is:

According to engineering experience, the gray value of the chip pin of the actual chip differs from the background gray value by more than 100. To obtain a strong feature point, the gray threshold can be set to 120 by using the FAST-9 method, and the gray threshold is the gray value difference between the chip pin of the actual chip and the background.

The other steps and parameters are the same as that of the Preferred Embodiment 1 or 2.

Preferred Embodiment 4

This embodiment differs from the Preferred Embodiment 1 to 3 in that: in the step (5), the process of: based on locations of the feature points extracted from step (4), extracting a feature point angle between two straight lines at which each feature point is located and a positive direction of an X-axis for each feature point, obtaining a feature point angle set as A comprises the steps of:

Step 5-1: Extracting region of interest (ROI) image of the feature point; obtaining the square region of interest image by taking the feature point as the center and a 1.5 times of the width of the chip pin as the side length of the square region of interest, wherein the region of interest has no rotation angle and is parallel to the image coordinate axis;

Step 5-2: Processing binarization with an adaptive threshold Otsu algorithm (Otsu) for the square region of interest image obtained by step 5-1 to obtain a binarized image;

Step 5-3: Extracting contours from binarized images;

Step 5-4: Processing polygon fitting for the contours extracted from the step 5-3, and sequentially storing vertices of the polygon in container 1 in the order in which the vertices are generated by the polygon fitting;

Step 5-5: Determining if the number of vertices in the container 1 in step 5-4 is equal to four, if yes, execute step 5-6, if not, repeat step 5-1 for the subsequent feature point;

Step 5-6: Excluding the points in the four vertices of the quadrilateral that are the vertex points of the image of the region of interest;

Step 5-7: determining two straight lines by the remaining three vertices of the quadrilateral according to the adjacent order in the quadrilateral;

Step 5-8: calculating the angle of the two straight lines;

Step 5-9: saving the angle in the set A until all the feature points are processed, and obtaining the feature points angle set of the two straight lines of K number of feature points (the remaining feature points after processing 5-1 to 5-8) and a positive direction of an X-axis, where $A=[\theta_1\ \theta_2\ \ldots\ \theta_{2h-1}\ \theta_{2h}\ \ldots\ \theta_{2K-1}\ \theta_{2L}]$, where $\theta_{2h-1}$ and $\theta_{2h}$ refers to the angle of the two straight lines where the h-th feature point is located, $\theta_{2K-1}$ and $\theta_{2K}$ refers to the angle of the two straight lines where the k-th feature point is located.

The other steps and parameters are the same as one of the Preferred Embodiments 1-3.

Preferred Embodiment 5

This embodiment differs from one of the Preferred Embodiments 1-4 in that: in the step 6: the process of sorting and filtering the feature point angel set A with a mixed Gaussian mixture model based on the feature point angle set A obtained from step (5) and obtaining a rough rotation angle of the actual component comprises the steps of:

Step 6-1: Let the angle of the major axis and minor axis of the component be $\varphi_1$ and $\varphi_2$; where $$|\varphi_1 - \varphi_2| = \frac{\pi}{2},$$

$\varphi_1 < \varphi_2$;

Step 6-2: If $\theta_j$ is the observations of $\varphi_1$, j=1, 2, ..., then observation $\theta_j$ obeys the following Gaussian distribution: $\theta_j \sim N(\varphi_1, \sigma_1^2)$; if $\theta_j$ is the observation of $\varphi_2$, then observation $\theta_j$ obeys the following Gaussian distribution: $\theta_j \sim N(\varphi_2, \sigma_2^2)$; $N(\varphi_1, \sigma_1^2)$ and $N(\varphi_2, \sigma_2^2)$ represent Gaussian distribution, $\sigma_1^2$ and $\sigma_2^2$ represent variance;

Step 6-3: Using a mixed Gaussian distribution to obtain a mixed Gaussian expression $E_1$:

$$E_1 = \sum_{j=1}^{2K} \sum_{k=1}^{2} \tau_k N(\theta_j \mid \varphi_k, \sigma_k^2)$$

where the mixing factor $0 \leq \tau_k \leq 1$, and $$\sum_{k=1}^{2} \tau_k = 1,$$

$N(\theta_j|\varphi_k,\sigma_k^2)$ is the Gaussian distribution, k=1, 2;

Step 6-4: solving iteratively by mixing Gaussian expression $E_1$ and expectation maximization (EM) algorithm, obtaining:

(a) initialization:

$$\varphi_1^0 = \frac{1}{2}\sum_{j=1}^{2K}\theta_j - \frac{\pi}{4},\ \varphi_2^0 = \frac{1}{2}\sum_{j=1}^{2K}\theta_j + \frac{\pi}{4},\ (\sigma_1^2)^0 = (\sigma_2^2)^0 = \frac{\pi}{4};$$

$\varphi_1^0$ and $\varphi_2^0$ are initialization values of $\varphi_1$ and $\varphi_2$ respectively, $(\sigma_1^2)^0$ and $(\sigma_2^2)^0$ are initialization values of $\sigma_1^2$ and $\sigma_2^2$ respectively;

(b) perform p-th iteration, p=1, 2, 3, . . . ;

(b-1) Perform the p-th expected value calculation:

$$\gamma_{jk}^p = \frac{\tau_k^{p-1} N(\theta_j \mid \varphi_k^{p-1}, (\sigma_k^2)^{p-1})}{\sum_{m=1}^{2} \tau_k^p N(\theta_j \mid \varphi_k^p, (\sigma_k^2)^p)}$$

(b-1) Perform the p-th maximization $E_1^p$ calculation:

$$\varphi_1^p = \frac{\sum_{j=1}^{2N}\sum_{k=1}^{2}\gamma_{jk}^p \theta_j - \frac{\pi}{2}\sum_{j=1}^{2N}\gamma_{jk}^p}{\sum_{j=1}^{2N}\sum_{k=1}^{2}\gamma_{jk}^p}$$

$$\varphi_2^p = \varphi_1^p + \frac{\pi}{2}$$

$$(\sigma_k^2)^p = \frac{\sum_{j=1}^{2N}\gamma_{jk}^p (\theta_j - \varphi_k)^2}{\sum_{j=1}^{2N}\gamma_{jk}^p}$$

$$\tau_k^p = \frac{\sum_{j=1}^{2N}\gamma_{jk}^p}{2N}$$

$$E_1^p = \sum_{j=1}^{2K}\sum_{k=1}^{2}\tau_k N(\theta_j \mid \varphi_k^p, (\sigma_k^2)^p)$$

Figure 5:
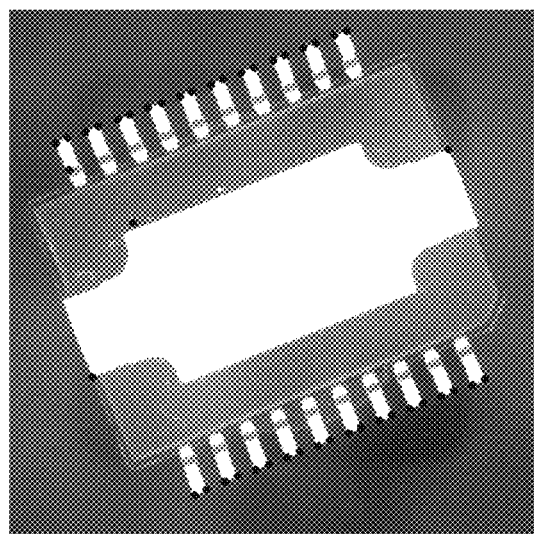
FIG. 5 illustrates the feature points of the rectangular pin component obtained by FAST-9 method in the Exemplary Embodiment 1.

(c) Determining iterative termination condition:

If $$\frac{E_1^p - E_1^{p-1}}{E_1^{p-1}} \leq 0.01$$

is satisfied, then iteration is terminated, the values of $\varphi_1$ and $\varphi_2$ are obtained; if not satisfied, then repeat steps (b) through (c) with p=p+1;

FIG. 5 illustrates a schematic diagram of the classification results using angle-constrained constraints.

Step (6-5): by using the values of $\varphi_1$ and $\varphi_2$ obtained from step (6-4), further filtering the K number of feature points obtained in step 5 to filter the appropriate feature points;

the feature points angle of the two straight lines and a positive direction of an X-axis of each feature point obtained from step 5-9 is compared with the values of $\varphi_1$ and $\varphi_2$; the feature points are retained if the following requirements are met, otherwise the feature points are deleted:

$|\theta_{2h-1}-\varphi_1|\leq 10$ and $|\theta_{2h}-\varphi_2|\leq 10$, or $|\theta_{2h-1}-\varphi_2|\leq 10$ and $|\theta_{2h}-\varphi_1|\leq 10$;

Step 6-6: select an angle greater than or equal to −30 degrees and less than or equal to 30 degrees from the values of $\varphi_1$ and $\varphi_2$ as the rough rotation angle $\varphi$ of the component.

The other steps and parameters are the same as one of the Preferred Embodiments 1-4.

Preferred Embodiment 6

This embodiment differs from one of the Preferred Embodiments 1-5 in that: in the step 8: a process of obtaining the position and angle of the actual component by using the point set registration CPD (coherent point drift) algorithm, and obtaining the positions of all key vertex points which are corresponding to the positions of the precise feature points respectively comprises the steps of:

Step 8-1: Using the rough rotation angle of the component obtained in step 6 as the initial angle of the CPD method;

Step 8-2: Linearly mapping the key vertex points to the [0,1] interval using the maximum and minimum normalization method, using the same mapping function as the linear mapping used by the vertex points to map the positions of the precise feature point obtained in step 7;

Step 8-3: using the rigid transformation in the CPD method to determine the position and angle of the component;

Step 8-4: using the position and angle of the component obtained from step 8-3, converting the key vertex points into image coordinate system, and using each key feature point as an center, building a square search window with a side length of 6 pixel, then using sub-pixel corner position detection algorithm searching method of open cross-platform computer vision library (OpenCV) to determine positions of the precise feature points U corresponding to the vertex points;

$$U=[u_1, u_2, \ldots u_M]^T$$

Where $u_i$ represents the position of the precise feature point corresponding to the i-th vertex point.

The other steps and parameters are the same as one of the Preferred Embodiments 1-5.

Preferred Embodiment 7

This embodiment differs from the Preferred Embodiment 1 to 6 in that: in the step 9, $F_{ri}$ refers to:

$$F_{ri}=[\|u_1-u_i\|_2 \ldots ,\|u_M-u_i\|_2]$$

The other steps and parameters are the same as one of the Preferred Embodiments 1-6.

Preferred Embodiment 8

This embodiment differs from the Preferred Embodiment 1 to 7 in that: in the step 10, the process of determining weight values of feature point pairs corresponding to vertex points of model component and vertex points of actual component based on the feature vector of the key vertex points of the model component obtained from step (3) and the feature vector of the key vertex points of the actual component obtained from step (9) comprises the steps of:

using the similarity calculation formula to calculate the feature similarity $w_i$ of the key vertex points corresponding to the model component and the actual components;

$$w_i = 1 - \frac{\left|\sum_{k=1}^{M} F_{rik} - \sum_{k=1}^{M} F_{mik}\right|}{\sum_{k=1}^{M} F_{mik}}$$

where $F_{rik}$ is the k-th element of the feature vector $F_{ri}$ of the i-th key vertex point of the actual component, $F_{mik}$ is the k-th element of the feature vector $F_{mi}$ of the i-th key vertex point of the model element; the feature similarity $w_i$ is the weight value of the feature point pair.

The other steps and parameters are the same as one of the Preferred Embodiments 1-7.

Preferred Embodiment 9

This embodiment differs from one of the Preferred Embodiment 1 to 8 in that: in the step 11, the process of determining the final position of the center c of the chip and the precise rotation angle θ of the chip comprises the steps of:

using the iterative method of unconstrained nonlinear programming function in MATLAB, the final position of the center c of the chip and the precise rotation angle θ of the chip are obtained;

the initial value is the position and angle of the component obtained in step 8-3:

$$(c, \theta) = \mathrm{argmin} F(c, \theta)$$

$$F(c, \theta) = \sum_{i=1}^{M} w_i (u_i - v_i R - c)^T (u_i - v_i R - c)$$

where R is a rotation matrix, $$R = \begin{bmatrix} \cos\theta & -\sin\theta \\ \sin\theta & \cos\theta \end{bmatrix}.$$

Exemplary Embodiment 1

Figure 4:
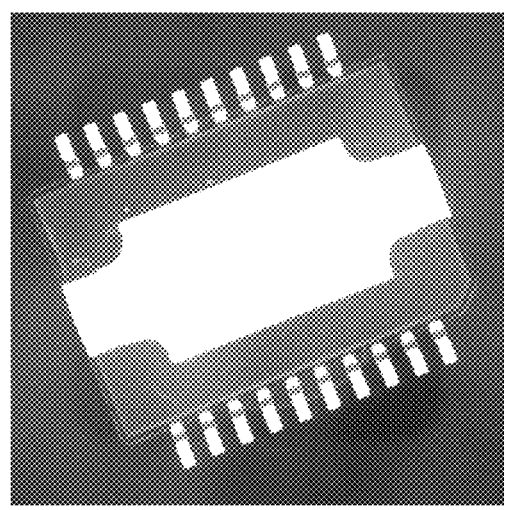
FIG. 4 is a picture of the actual component for testing in Exemplary Embodiment 1.
Figure 6:
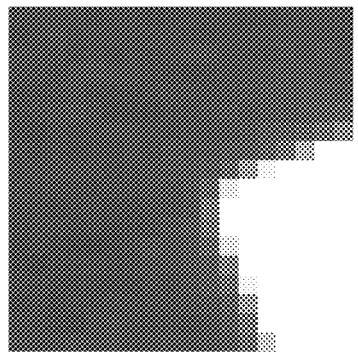
FIG. 6 is an illustration of the feature point ROI of the Exemplary Embodiment 1.
Figure 7:
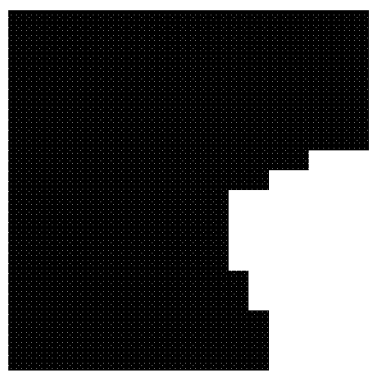
FIG. 7 is a binarization map illustration of the feature point ROI of the Exemplary Embodiment 1.
Figure 8:
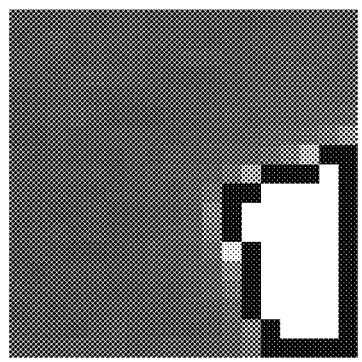
FIG. 8 is an outline extraction map illustration of the feature point ROI of the Exemplary Embodiment 1.
Figure 9:
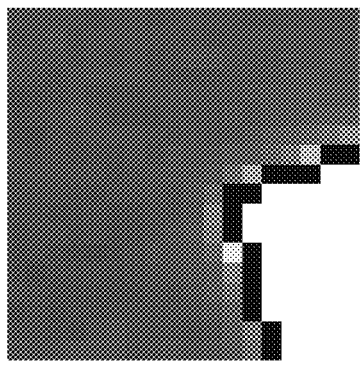
FIG. 9 is a schematic diagram of two straight lines in which the feature points are located.
Figure 10:
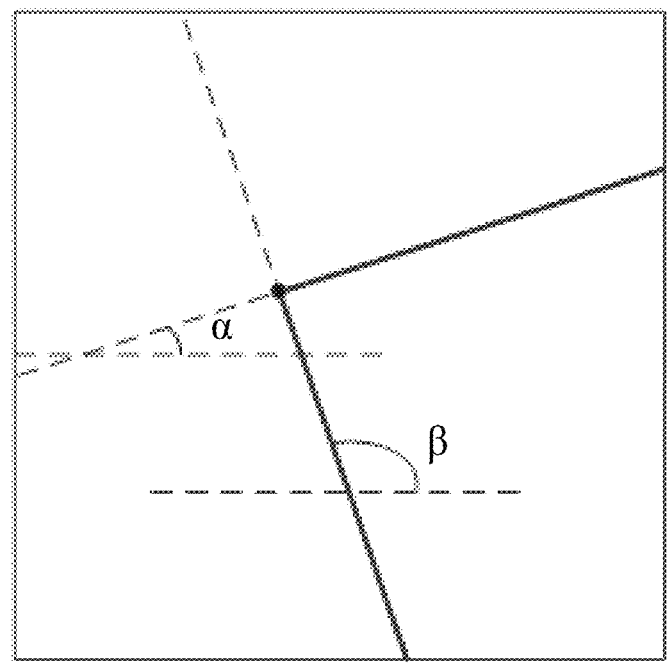
FIG. 10 is an illustration of the feature point angle between the two straight lines in which the feature points are located and a positive direction of an X-axis; a and θ are the feature point angle between the two straight lines in which the feature points are located and the positive direction of an X-axis respectively.
Figure 11:
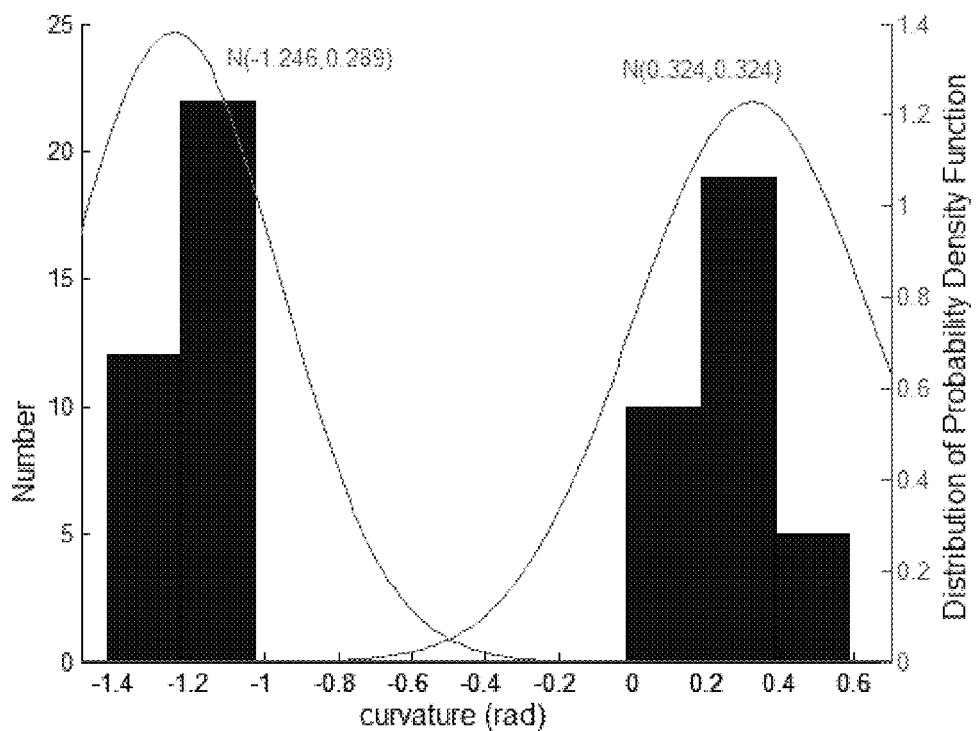
FIG. 11 is an illustration of the classification results of the Exemplary Embodiment 1.
Figure 12:
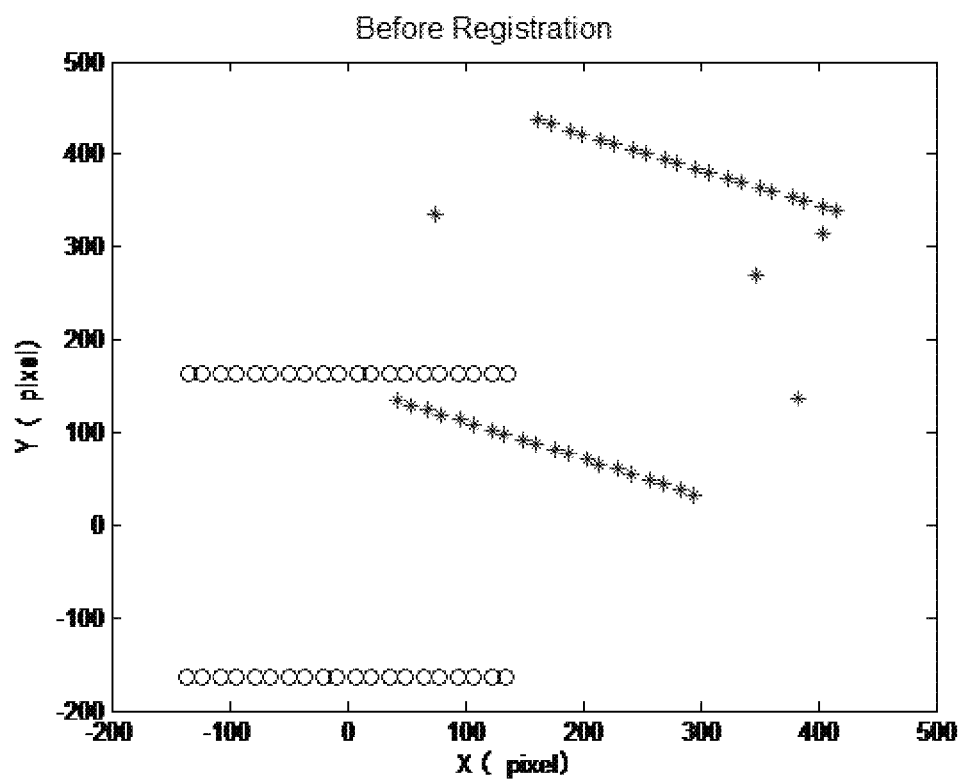
FIG. 12 is an illustration of key vertex points before registration and the precise feature points obtained in Step 7 according to the Exemplary Embodiment 1; the 'pixel' shown in the figure refers to pixel.
Figure 13:
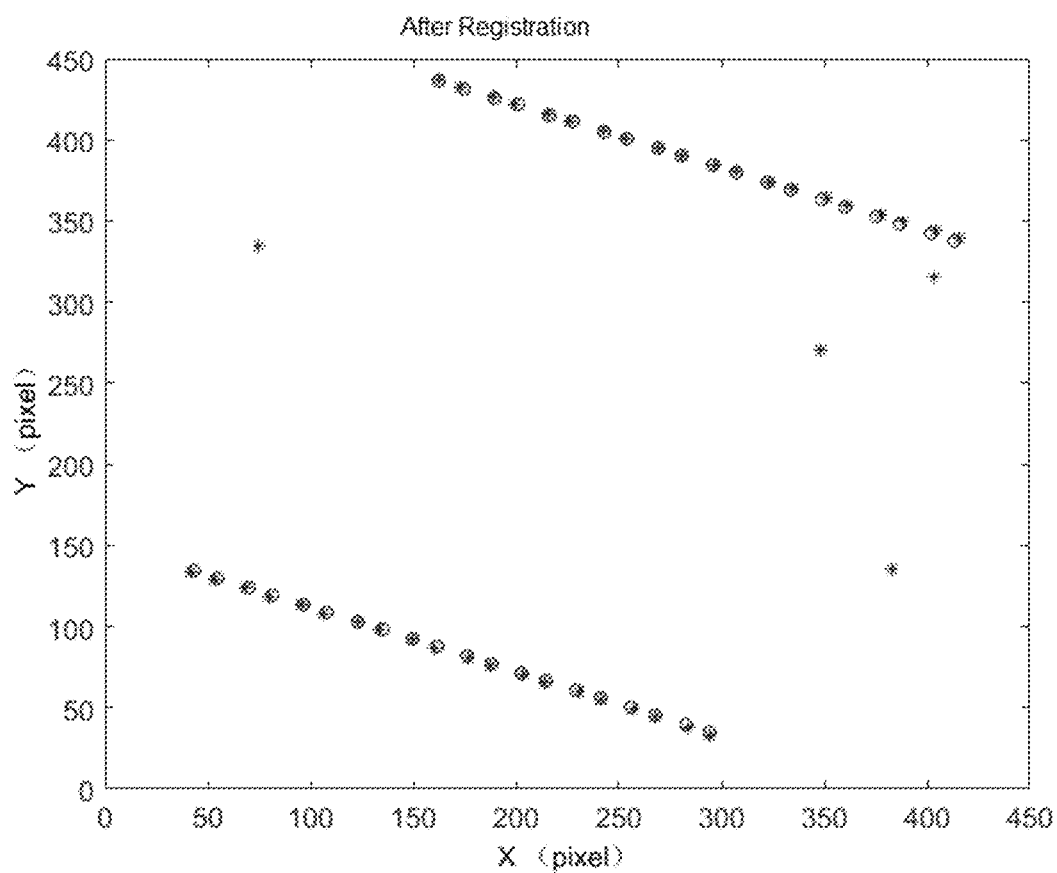
FIG. 13 is an illustration of the results after registration according to the Exemplary Embodiment 1.

The real image (image for testing) of the actual component is obtained online, which is as shown in FIG. 4, and the image of the component is processed by the FAST method, and the corner detection is performed as shown in FIG. 5 (the black solid dot in the figure is the point obtained by the corner detection). The image is binarized and contour extraction is processed, which is shown in FIGS. 6-8. The two straight lines where the feature points are located are shown in FIG. 9. The angle between the two straight lines where the feature points are located and the positive direction of the X-axis is shown in FIG. 10; the classification result with angle constraint is shown in FIG. 11. In the case of FIG. 11, the rough rotation angle φ of the component is 0.324 radians (converted to an angle of 0.324/π×80=18.56). The key vertex points and the precise feature points before registration are shown in FIG. 12 in which the key vertex points are indicated by circles and the precise feature points are indicated by asterisks; the results after registration are shown in FIG. 13.

Exemplary Embodiment 2

Figure 14:
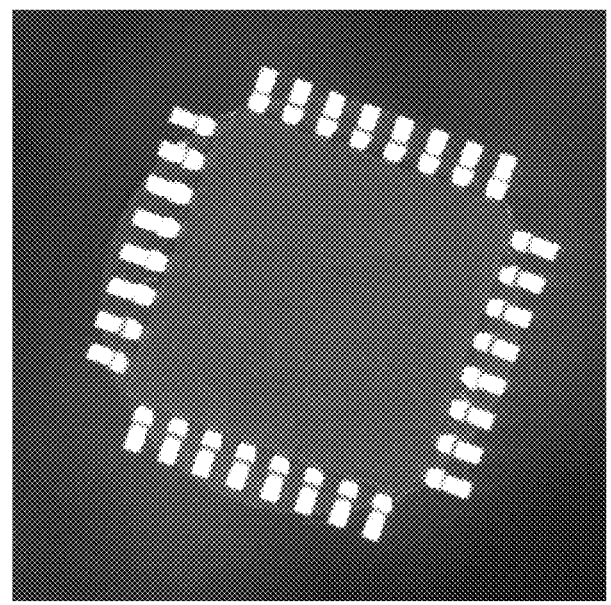
FIG. 14 is a picture of the actual component for testing in Exemplary Embodiment 2.
Figure 15:
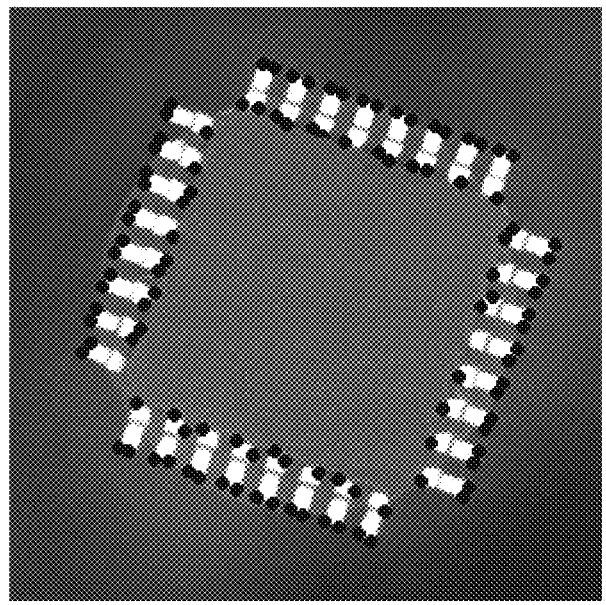
FIG. 15 illustrates the feature points of the rectangular pin component obtained by FAST-9 method in the Exemplary Embodiment 2.
Figure 16:
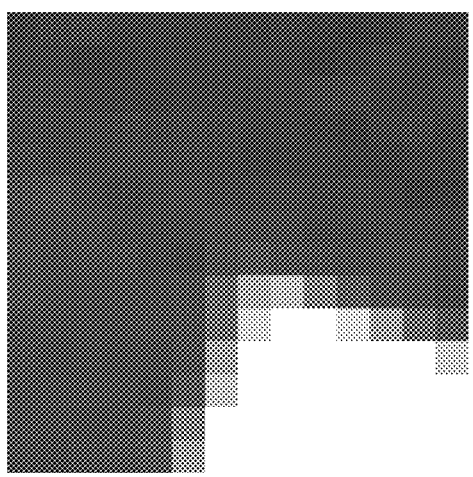
FIG. 16 is an illustration of the feature point ROI of the Exemplary Embodiment 2.
Figure 17:
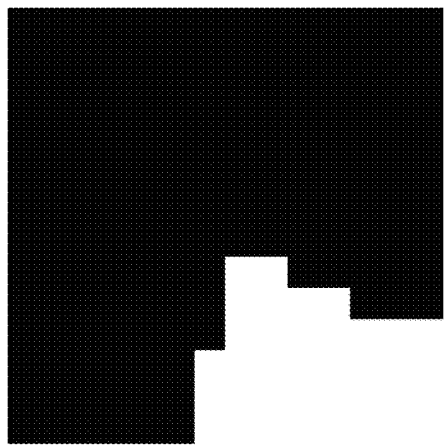
FIG. 17 is a binarization map illustration of the feature point ROI of the Exemplary Embodiment 2.
Figure 18:
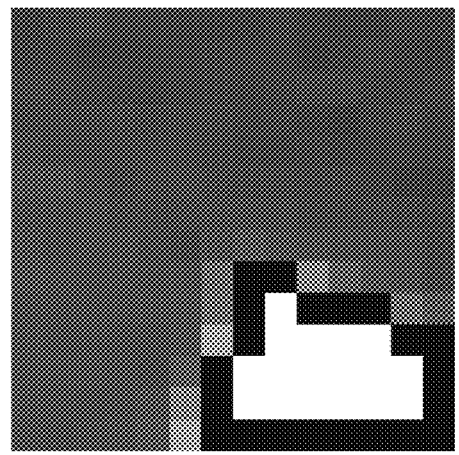
FIG. 18 is an outline extraction map illustration of the feature point ROI of the Exemplary Embodiment 2.
Figure 19:
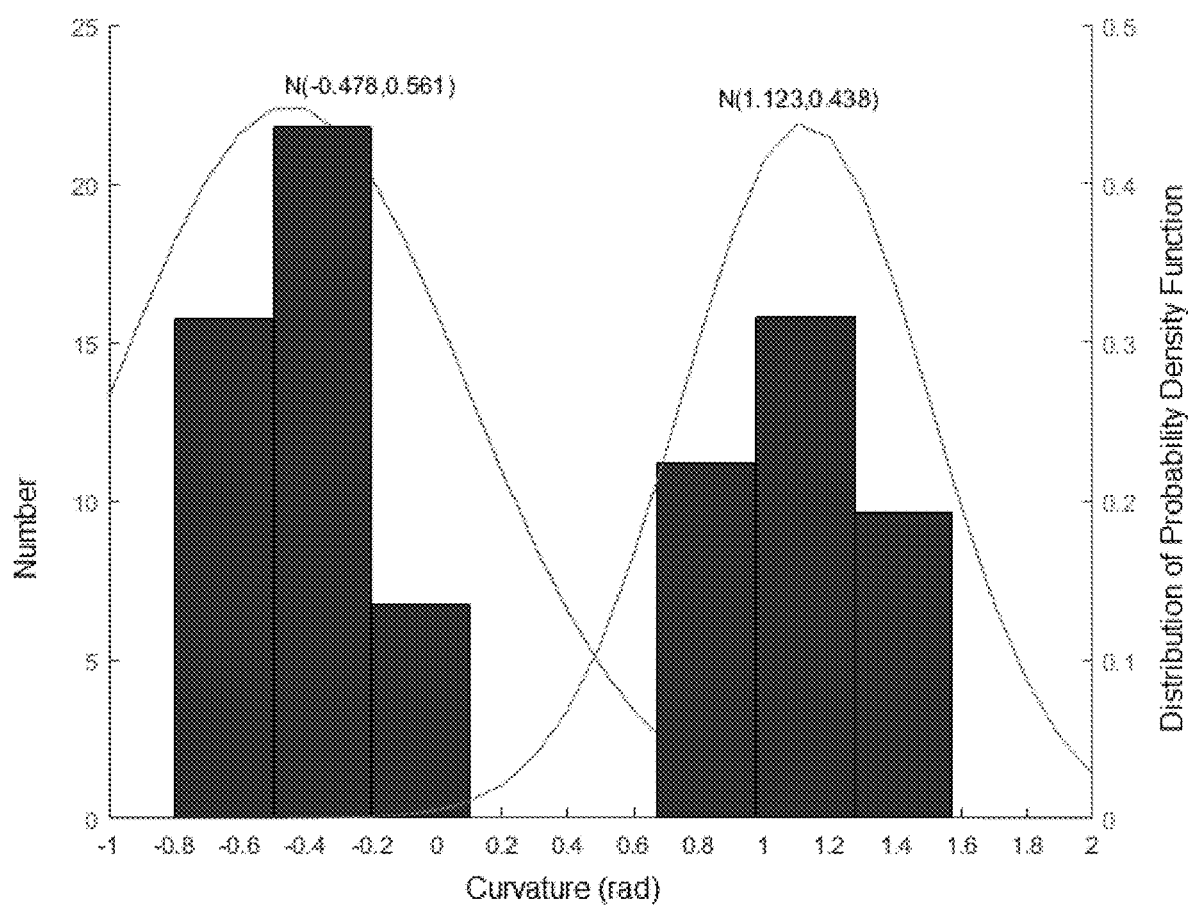
FIG. 19 is an illustration of the classification results of the Exemplary Embodiment 2.
Figure 20:
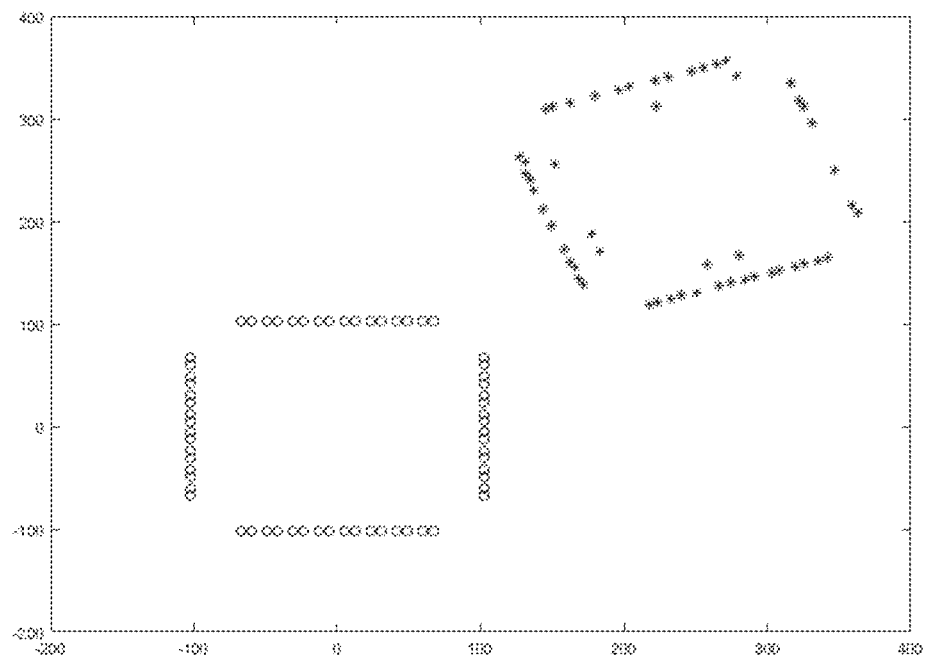
FIG. 20 is an illustration of key vertex points before registration and the precise feature points obtained in Step 7 according to the Exemplary Embodiment 2; the 'pixel' shown in the figure refers to pixel.
Figure 21:
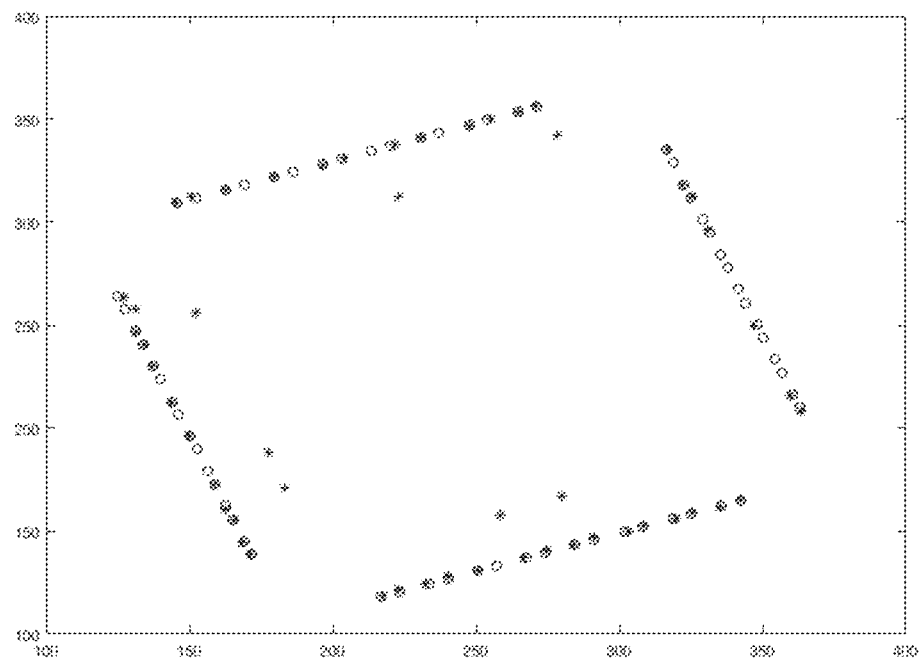
FIG. 21 is an illustration of the results after registration according to the Exemplary Embodiment 2.

The real image (image for testing) of the actual component is obtained online, which is as shown in FIG. 14, and the image of the component is processed by the FAST method, and the corner detection is performed as shown in FIG. 15 (the black solid dot in the figure is the point obtained by the corner detection). The image is binarized and contour extraction is processed, which is as shown in FIGS. 16-18. The classification result with angle constraint is shown in FIG. 19. In the case of FIG. 19, the rough rotation angle φ of the component is −0.447 radians. The key vertex points and the precise feature points before registration are shown in FIG. 20 in which the key vertex points are indicated by circles and the precise feature points are indicated by asterisks; the results after registration are shown in FIG. 21.

Exemplary Embodiment 3

Figure 22:
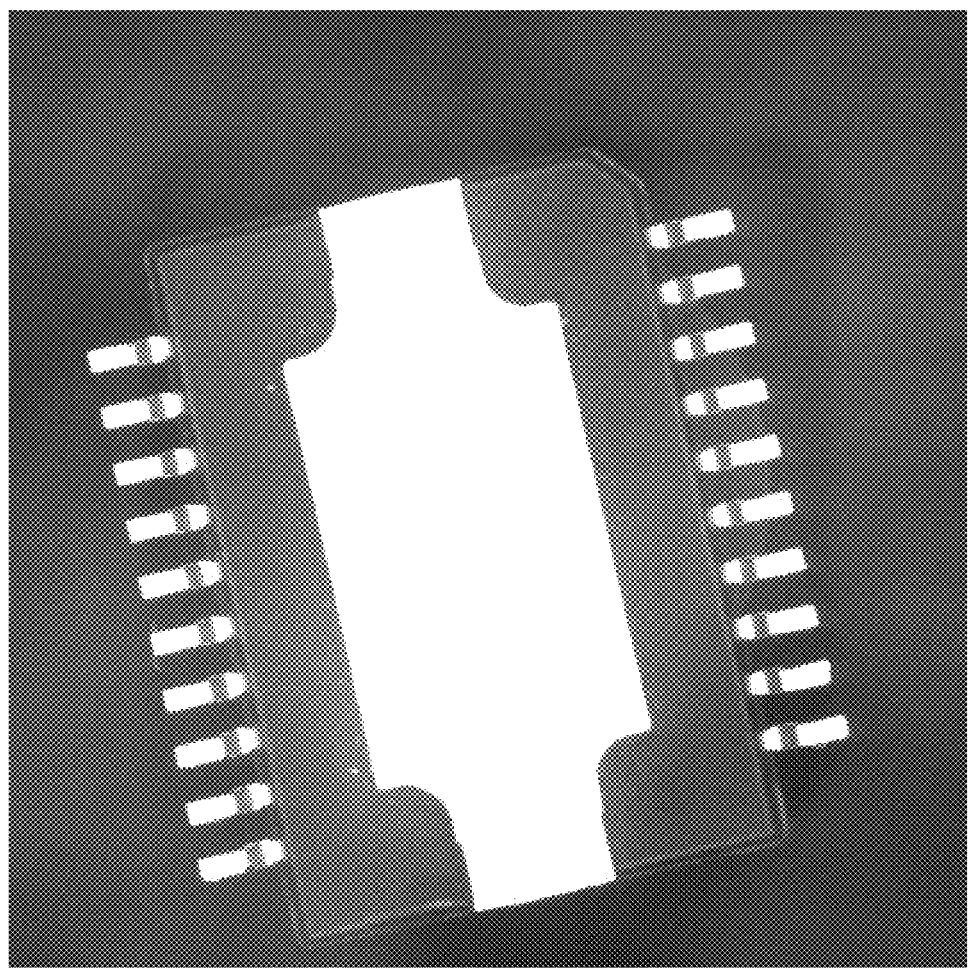
FIG. 22 is a picture of the actual component for testing in Exemplary Embodiment 3.
Figure 23:
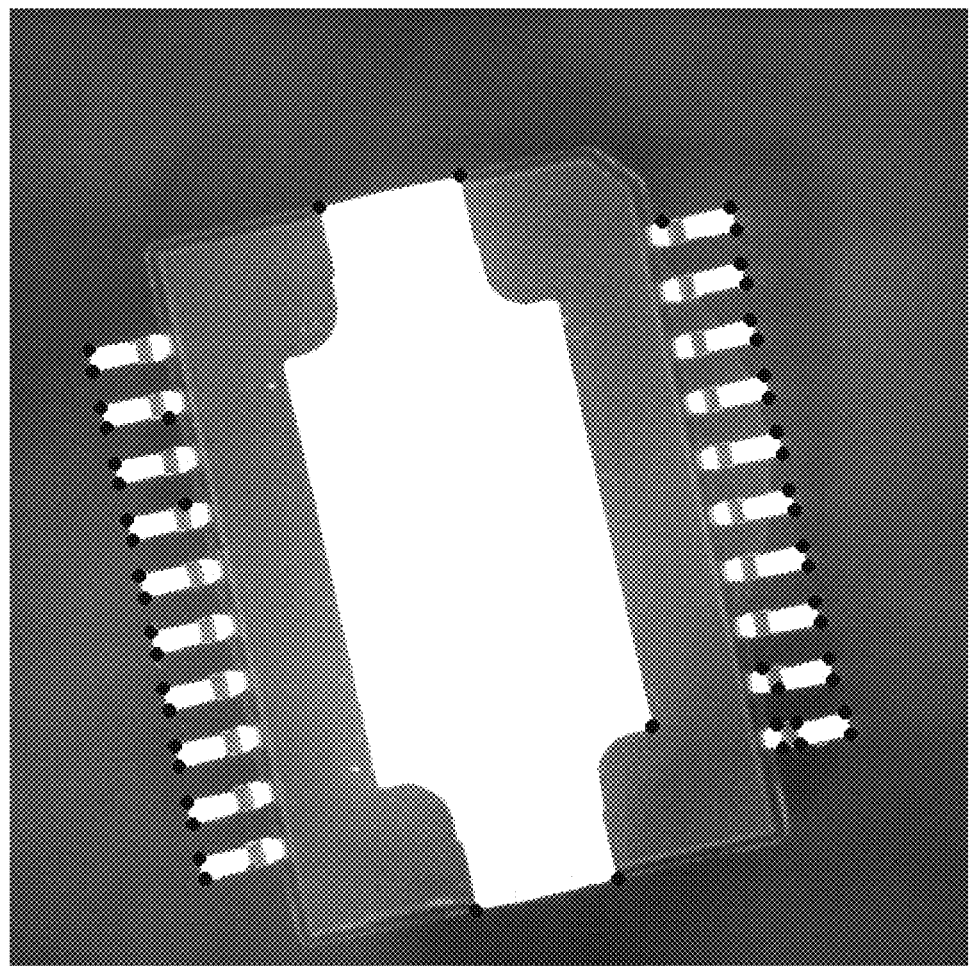
FIG. 23 illustrates the feature points of the rectangular pin component obtained by FAST-9 method in the Exemplary Embodiment 3.
Figure 24:
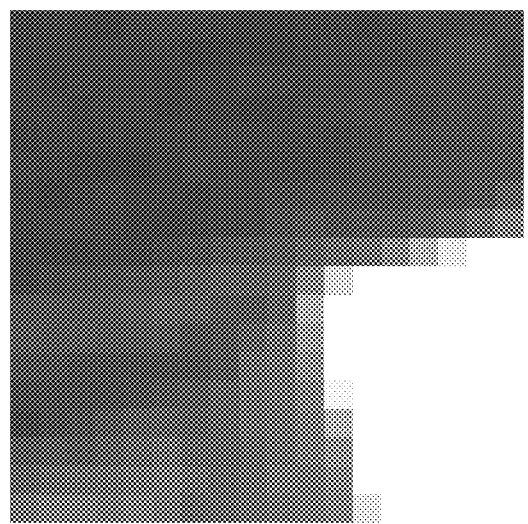
FIG. 24 is an illustration of the feature point ROI of the Exemplary Embodiment 3.
Figure 25:
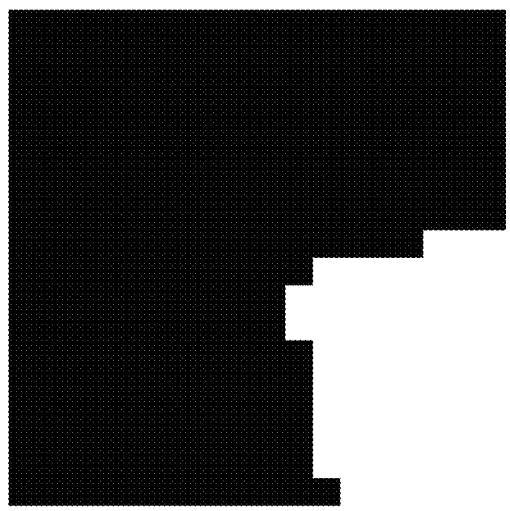
FIG. 25 is a binarization map illustration of the feature point ROI of the Exemplary Embodiment 3.
Figure 26:
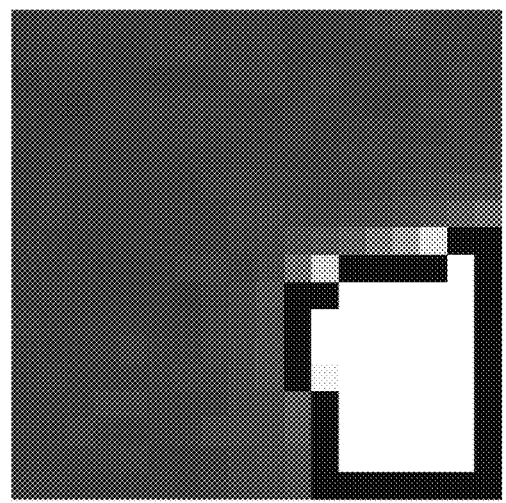
FIG. 26 is an outline extraction map illustration of the feature point ROI of the Exemplary Embodiment 3.
Figure 27:
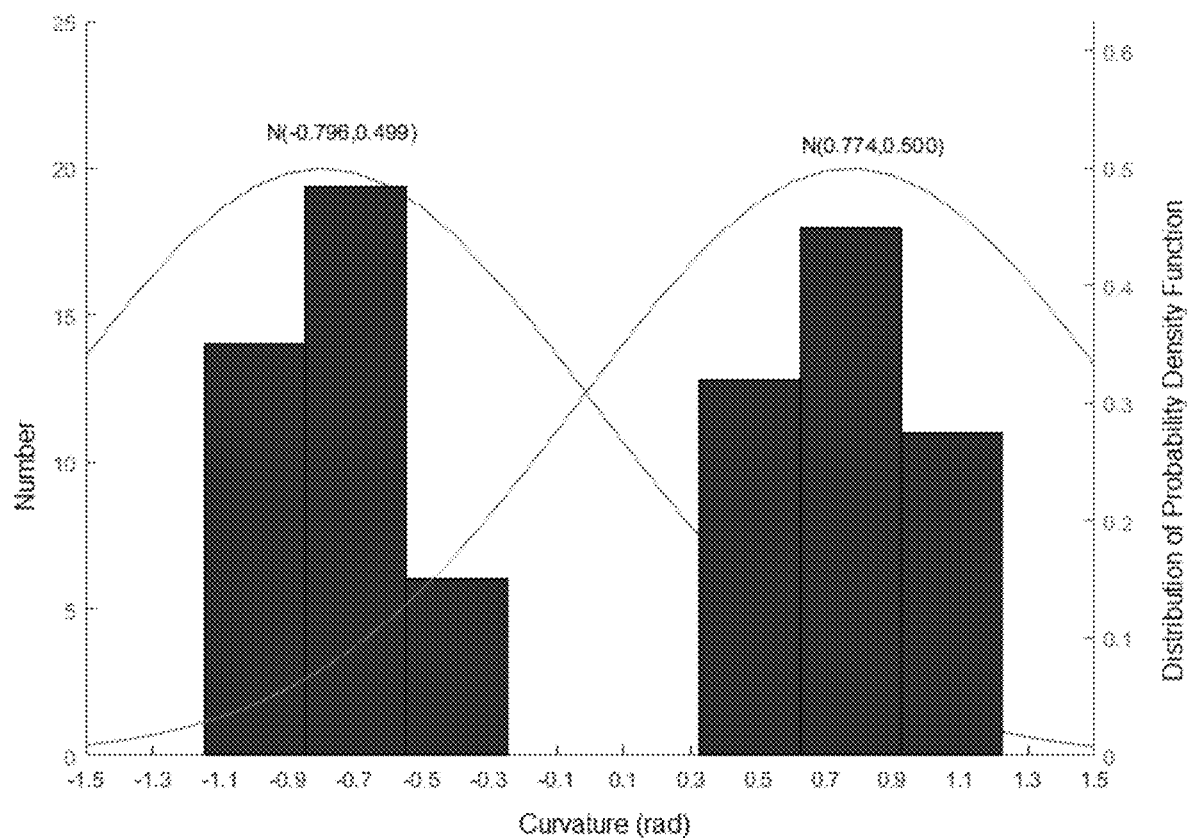
FIG. 27 is an illustration of the classification results of the Exemplary Embodiment 3.
Figure 28:
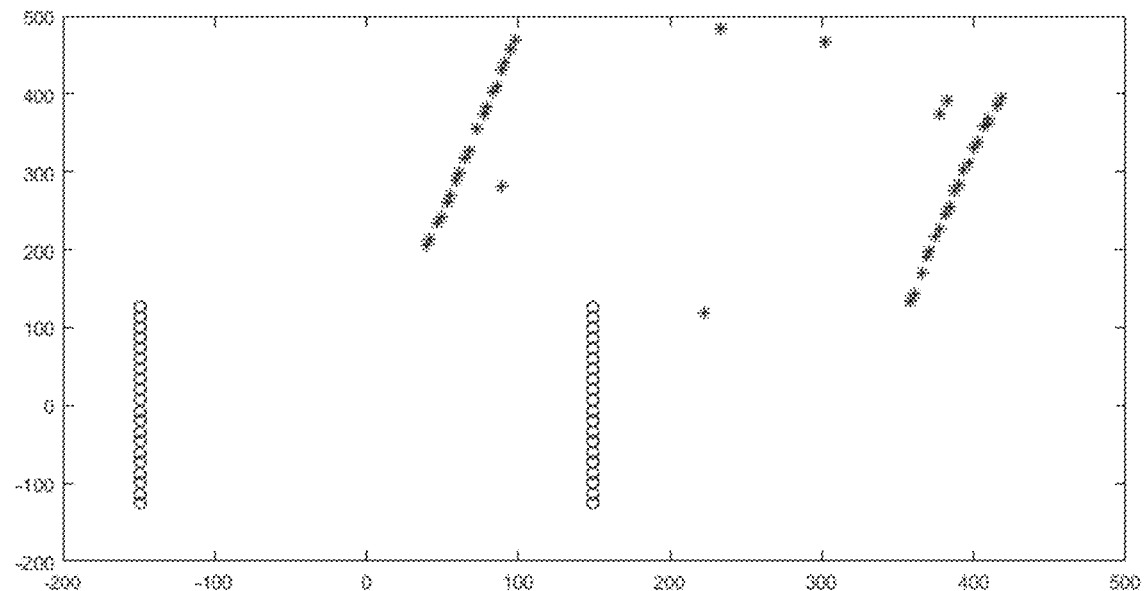
FIG. 28 is an illustration of key vertex points before registration and the precise feature points obtained in Step 7 according to the Exemplary Embodiment 3; the 'pixel' shown in the figure refers to pixel.
Figure 29:
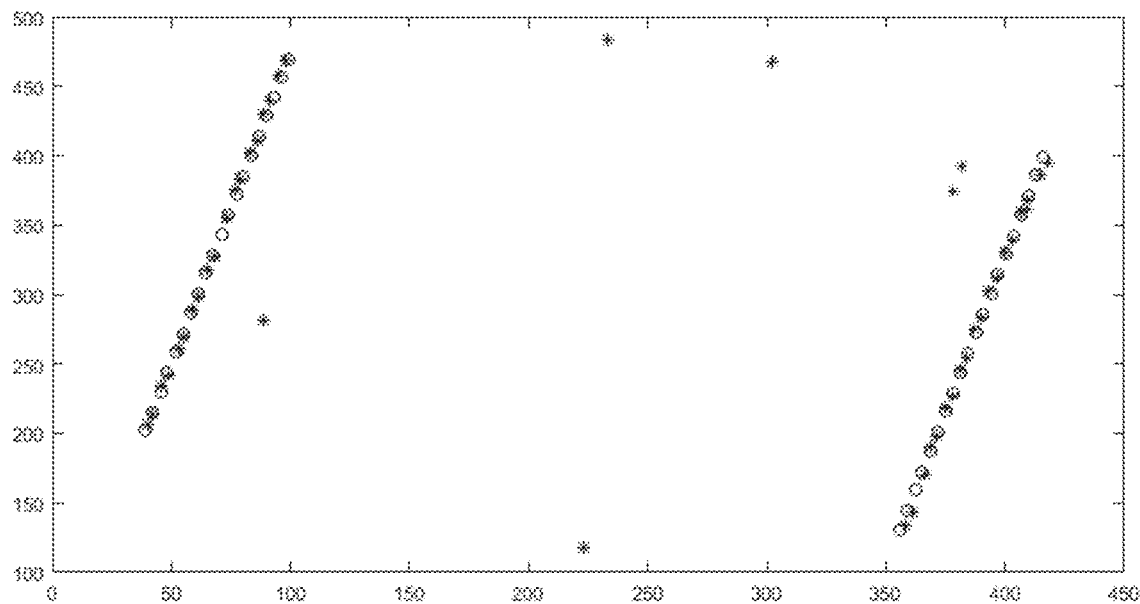
FIG. 29 is an illustration of the results after registration according to the Exemplary Embodiment 3.

The real image (image for testing) of the actual component is obtained online, which is as shown in FIG. 22, and the image of the component is processed by the FAST method, and the corner detection is performed as shown in FIG. 23 (the black solid dot in the figure is the point obtained by the corner detection). The image is binarized and contour extraction is processed, which is as shown in FIGS. 24-26. The classification result with angle constraint is shown in FIG. 27. In the case of FIG. 27, the rough rotation angle φ of the component is 0.774 radians. The key vertex points and the precise feature points before registration are shown in FIG. 28 in which the key vertex points are indicated by circles and the precise feature points are indicated by asterisks; the results after registration are shown in FIG. 29.

The above-presented embodiments are preferred examples for implementing the present invention, and the present invention is not limited to the above embodiments. Any non-essential additions and replacements made by those skilled in the art according to the technical features of the technical solutions of the present invention all belong to the protection scope of the present invention.

What is claimed is:

1. A positioning method of rectangular pin component based on vertex points, comprising the steps of:
    (a) obtaining component information of a model by using an image processing method or a component datasheet, wherein the component information comprises a component size, number of pins, pin length, pin width and pin location;
    (b) defining vertex points of a pin element of the component of the model as two vertex points away from a chip body on each rectangular pin element and recording as: $V=[v_1, v_2, \ldots, v_M]^T$, where $v_i \in R^2$, i=1, 2, . . . , M refers to i-th vertex point, and is a row vector of a two-dimensional vector; M refers to a number of vertex points, $R^2$ refers to two-dimensional space;
    (c) extracting feature descriptors for each vertex point of the pin element of the component of the model, wherein each feature descriptor is represented by a distance between vertex points, and a feature vector of an i-th vertex point of the component of the model is represented by a vector $F_{mi}$ of an M-dimensional vector;
    (d) obtaining a real image of an actual component and processing the real image of the actual component by FAST method to extract feature points;
    (e) based on locations of the feature points extracted from step (d), extracting a feature point angle between two straight lines at which each feature point is located and a positive direction of an X-axis for each feature point, obtaining a feature point angle set as A, establishing a coordinate system with a center of the actual component image as an origin and an X-axis is along a horizontal direction;
    (f) based on the feature point angle set A obtained from step (e), sorting and filtering the feature point angel set A with a mixed Gaussian mixture model and obtaining a rotation angle of the actual component;
    (g) using each feature point from step (f) as an center, building a square search window with a side length of 6-10 pixels to process searching, obtaining positions of sub-pixel feature points, which are positions of precise feature points, by using sub-pixel corner position detection algorithm for open cross-platform computer vision library;
    (h) determining a position and an angle of the actual component by using a point set registration CPD, coherent point drift, algorithm, and determining positions of precise feature points which are corresponding to all key vertex points respectively;
    (i) using the positions of the precise feature points which are corresponding to the positions of all key vertex points obtained from step (h), obtaining feature descriptor of the key vertex points of pins of the actual component, using a vector $F_{ri}$ of an M-dimensional vector to represent a feature vector of an i-th key vertex point of the actual component;
    (j) based on the feature vector of the key vertex points of the model component obtained from step (c) and the feature vector of the key vertex points of the actual component obtained from step (i), determining weight values of feature point pairs corresponding to vertex points of model component and vertex points of actual component; and
    (k) based on the position and angle of the actual component obtained from step (h) and the weight values of feature point pairs corresponding to vertex points of model component and vertex points of actual component obtained from step (j), determining a final position of a center c of the actual component, which is in the chip, and a precise rotation angle θ of the actual component, which is in the chip.

2. The positioning method of rectangular pin component based on vertex points according to claim 1, wherein in the step (c), $F_{mi}$ refers to:

$$f_{mi}=[\|v_1-v_i\|_2, \ldots, \|v_M-v_i\|_2]$$

wherein $\|\Box\|_2$ is 2-norm of the vector.

3. The positioning method of rectangular pin component based on vertex points according to claim 2, wherein in the step (d), a process of obtaining a real image of the actual component online and processing the real image of the actual component by FAST method to extract feature points comprises the steps of:
    setting a gray threshold as 50~120 by using a FAST-9 method, wherein the gray threshold is a gray value difference between the pin of the actual component and the background.

4. The positioning method of rectangular pin component based on vertex points according to claim 3, wherein in the step (e), further comprises a process of extracting the feature point angle between two straight lines at which each feature point is located and the positive direction of the X-axis for each feature point based on locations of the feature points extracted from step (d) and obtaining the feature point angle set as A, which comprises the steps of:
    step (e-1): Extracting a region of interest, ROI, image of the feature point; obtaining a square region of interest image by taking the feature point as a center and a 1.5 times of a width of the pin as a side length of the square region of interest, wherein the region of interest has no rotation angle and is parallel to an image coordinate axis;

step (e-2): Processing binarization with an adaptive threshold Otsu algorithm for the square region of interest image obtained by step (e-1) to obtain a binarized image;

step (e-3): extracting contour from the binarized image;

step (e-4): processing polygon fitting for the contour extracted from the step (e-3), and sequentially storing vertices of the polygon in container 1 in the order in which the vertices are generated by the polygon fitting;

step (e-5): determining if a number of vertices of the polygon in the container 1 in step (e-4) is equal to four, if yes, executing step (e-6), if not, repeating step (e-1) for a subsequent feature point, wherein the polygon is defined as a quadrilateral;

step (e-6): excluding points in four vertices of the quadrilateral that are the vertex points of the image of the region of interest;

step (e-7): determining two straight lines by the remaining three vertices of the quadrilateral according to an adjacent order in the quadrilateral;

step (e-8): calculating an angle of the two straight lines;

step (e-9): saving the angle in the set A until all the feature points are processed, and obtaining the feature points angle set A of the two straight lines of K number of feature points along the positive direction of an X-axis, where $A=[\theta_1\ \theta_2\ \ldots\ \theta_{2h-1}\ \theta_{2h}\ \ldots\ \theta_{2K-1}\ \theta_{2K}]$, where $\theta_{2h-1}$ and $\theta_{2K}$ refers to the angle of the two straight lines where the h-th feature point is located, $\theta_{2K-1}$ and $\theta_{2K}$ refers to the angle of the two straight lines where the k-th feature point is located.

5. The positioning method of rectangular pin component based on vertex points according to claim 4, wherein in the step (f), further comprises a process of sorting and filtering the feature point angel set A with a mixed Gaussian mixture model based on the feature point angle set A obtained from step (e) and obtaining a rough rotation angle of the actual component, which comprises the steps of:

step (f-1): setting an angle of a major axis and a minor axis of the component as $\varphi_1$ and $\varphi_2$; where $$|\varphi_1 - \varphi_2| = \frac{\pi}{2},$$

$\varphi_1 < \varphi_2$;

step (f-2): defining $\theta_j$, wherein if $\theta_j$ is the observations of $\varphi_1$, $j=1, 2, \ldots, 2K$, then the observation $\theta_j$ obeys a first Gaussian distribution: $\theta_j \square N(\varphi_1, \sigma_1^2)$; if is the observation of $\varphi_2$, then the observation $\theta_j$ obeys a second Gaussian distribution: $\theta_j \square N(\varphi_2, \sigma_2^2)$; $N(\varphi_1, \sigma_1^2)$ and $N(\varphi_2, \sigma_2^2)$ represent the Gaussian distribution, $\sigma_1^2$ and $\sigma_2^2$ represent variance;

step (f-3): using a mixed Gaussian distribution to obtain a mixed Gaussian expression $E_1$:

$$E_1 = \sum_{j=1}^{2K} \sum_{k=1}^{2} \tau_k N(\theta_j \mid \varphi_k, \sigma_k^2)$$

where a mixing factor $0 \leq \tau_k \leq 1$, and $$\sum_{k=1}^{2} \tau_k = 1,$$

$N(\theta_j|\varphi_k, \sigma_k^2)$ is the Gaussian distribution, k=1, 2;

step (f-4): solving iteration by mixing Gaussian expression $E_1$ and expectation maximization algorithm and obtaining:

(i) initialization:

$$\varphi_1^0 = \frac{1}{2}\sum_{j=1}^{2K}\theta_j - \frac{\pi}{4},\ \varphi_2^0 = \frac{1}{2}\sum_{j=1}^{2K}\theta_j + \frac{\pi}{4},\ (\sigma_1^2)^0 = (\sigma_2^2)^0 = \frac{\pi}{4};$$

$\varphi_1^0$ and $\varphi_2^0$ are initialization values of $\varphi_1$ and $\varphi_2$ respectively, $(\sigma_1^2)^0$ and $(\sigma_2^2)^0$ are initialization values of $\sigma_1^2$ and $\sigma_2^2$ respectively;

(ii) then performing p-th iteration, p=1, 2, 3, . . . ;

(ii-a) performing p-th expected value calculation:

$$\gamma_{jk}^p = \frac{\tau_k^{p-1} N(\theta_j \mid \varphi_k^{p-1}, (\sigma_k^2)^{p-1})}{\sum_{m=1}^{2} \tau_k^p N(\theta_j \mid \varphi_k^p, (\sigma_k^2)^p)}$$

(ii-b) performing p-th maximization $E_1^P$ calculation:

$$\varphi_1^p = \frac{\sum_{j=1}^{2N}\sum_{k=1}^{2}\gamma_{jk}^p \theta_j - \frac{\pi}{2}\sum_{j=1}^{2N}\gamma_{jk}^p}{\sum_{j=1}^{2N}\sum_{k=1}^{2}\gamma_{jk}^p}$$

$$\varphi_2^p = \varphi_1^p + \frac{\pi}{2}$$

$$(\sigma_k^2)^p = \frac{\sum_{j=1}^{2N}\gamma_{jk}^p(\theta_j - \varphi_k)^2}{\sum_{j=1}^{2N}\gamma_{jk}^p}$$

$$\tau_k^p = \frac{\sum_{j=1}^{2N}\gamma_{jk}^p}{2N}$$

$$E_1^P = \sum_{j=1}^{2K}\sum_{k=1}^{2}\tau_k N(\theta_j \mid \varphi_k^p, (\sigma_k^2)^p)$$

(iii) determining iteration termination condition, wherein if $$\frac{E_1^p - E_1^{p-1}}{E_1^{p-1}} \leq 0.01$$

is satisfied, then iteration is terminated, the values of $\varphi_1$ and $\varphi_2$ are obtained; if not satisfied, then steps (b) through (c) are repeated with p=p+1;

step (f-5): by using the values of $\varphi_1$ and $\varphi_2$ obtained from step (f-4), further filtering the K number of feature points obtained in step 5;

wherein the feature point angle of the two straight lines and a positive direction of an X-axis of each feature point obtained from step 5-9 is compared with the values of $\varphi_1$ and $\varphi_2$; the feature points are retained if the following requirements are met, otherwise the feature points are deleted:

$|\theta_{2h-1}-\varphi_1| \le 10$ and $|\theta_{2h}-\varphi_2| \le 10$, or $|\theta_{2h-1}-\varphi_2| \le 10$ and $|\theta_{2h}-\varphi_1| \le 10$;

step (f-6): selecting an angle greater than or equal to −30 degrees and less than or equal to 30 degrees from the values of $\varphi_1$ and $\varphi_2$ as the rough rotation angle $\varphi$ of the component.

6. The positioning method of rectangular pin component based on vertex points according to claim 3, wherein in the step (h), further comprises a process of obtaining the position and angle of the actual component by using the point set registration CPD, coherent point drift, algorithm, and obtaining the positions of all precise feature points which are corresponding to the positions of the vertex points respectively, which comprises the steps of:

step (h-1): Using the rough rotation angle of the component obtained in step (f) as an initial angle of a CPD method;

step (h-2): linear mapping the vertex points to the 0 and 1 interval using a maximum and minimum normalization method, using a mapping function identical to the linear mapping used by the vertex points to map the positions of the precise feature point obtained in step g;

step (h-3): using a rigid transformation in the CPD method to determine a position and an angle of the component;

step (h-4): using the position and the angle of the component obtained from step (h-3), converting the vertex points into an image coordinate system, and using each of the feature points as a center, building a square search window with a side length of 6 pixels, then using sub-pixel corner position detection algorithm searching method of open cross-platform computer vision library, OpenCV, to determine positions of the precise feature points U corresponding to the vertex points;

wherein $U=[u_1, u_2, \ldots, u_M]^T$ where $u_i$ represents the position of the precise feature point corresponding to the i-th vertex point.

7. The positioning method of rectangular pin component based on vertex points according to claim 6, wherein in the step (i), F refers to:

$F_{ri}=[|u_1-u_i|_2, \ldots, |u_M-u_i|_2]$.

8. The positioning method of rectangular pin component based on vertex points according to claim 7, wherein in the step (j), further comprises a process of determining weight values of feature point pairs corresponding to vertex points of model component and vertex points of actual component based on the feature vector of the key vertex points of the model component obtained from step (c) and the feature vector of the key vertex points of the actual component obtained from step (i), which comprises the steps of:

using a similarity calculation formula to calculate a feature similarity $w_i$ of the key vertex points corresponding to the model component and the actual component; where $$w_i = 1 - \frac{\left|\sum_{k=1}^{M} F_{rik} - \sum_{k=1}^{M} F_{mik}\right|}{\sum_{k=1}^{M} F_{mik}}$$

where $F_{rik}$ is a k-th element of the feature vector of an i-th key vertex point of the actual component, $F_{mik}$ is a k-th element of the feature vector $F_{mi}$ of an i-th key vertex point of the model component; the feature similarity $w_i$ is a weight value of feature point pair.

9. The positioning method of rectangular pin component based on vertex points according to claim 8, wherein in the step (k), further comprise a process of determining the final position of the center c of the chip and the precise rotation angle $\theta$ of the chip, which comprises the steps of:

using an iterative method of unconstrained nonlinear programming function in MATLAB, obtaining a final position of the center c of the chip and a precise rotation angle $\theta$ of the chip;

wherein an initial value is the position and the angle of the component obtained in step (h-3);

where:

$$(c, \theta) = \mathrm{argmin} F(c, \theta)$$

$$F(c, \theta) = \sum_{i=1}^{M} w_i (u_i - v_i R - c)^T (u_i - v_i R - c)$$

where R is a Rotation matrix, and $$R = \begin{bmatrix} \cos\theta & -\sin\theta \\ \sin\theta & \cos\theta \end{bmatrix}.$$

* * * * *